Jan. 4, 1944. S. C. WHITMAN 2,338,388
IRRADIATING TUBE
Original Filed April 4, 1941
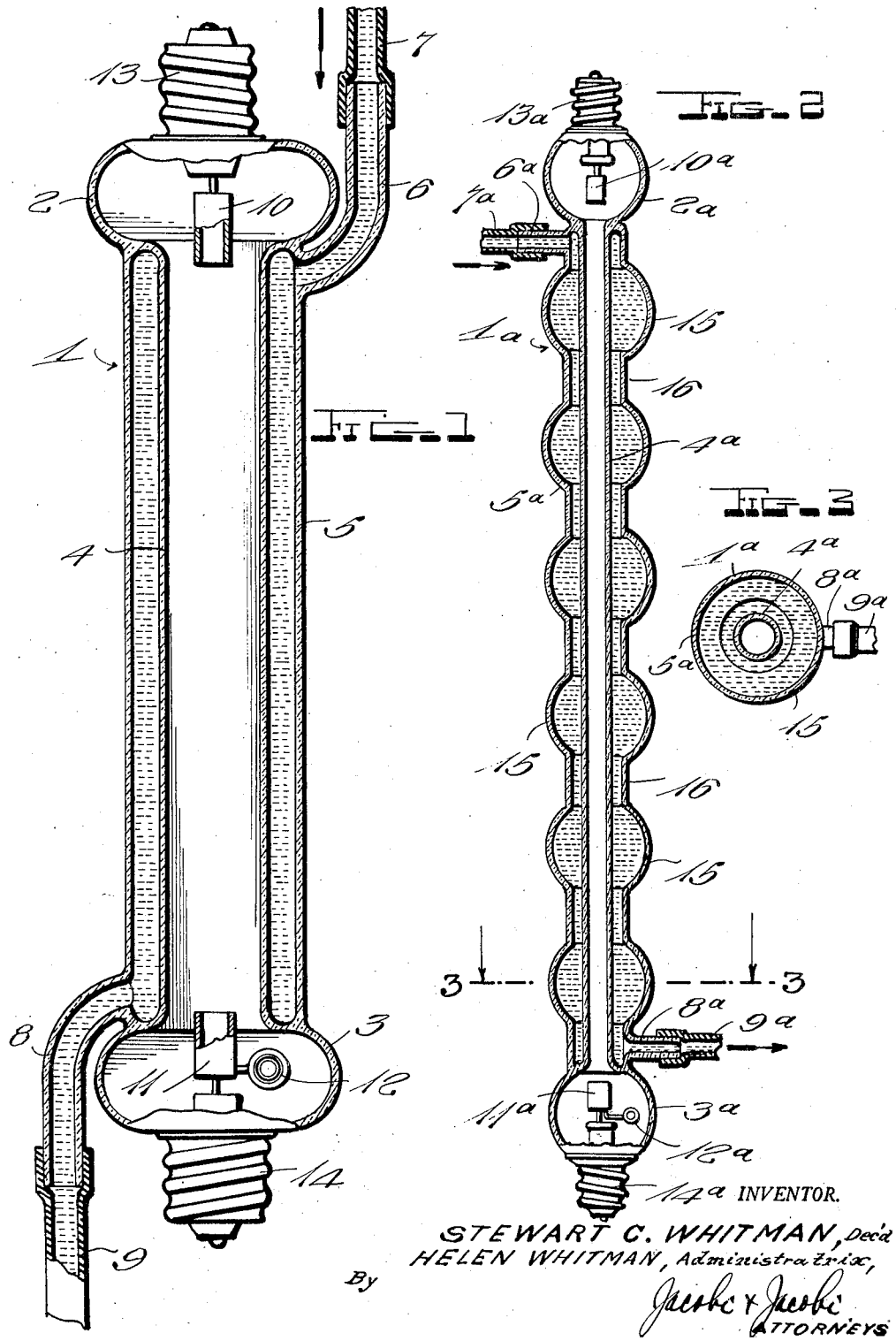
INVENTOR.
STEWART C. WHITMAN, Dec'd
HELEN WHITMAN, Administratrix,
By
ATTORNEYS Patented Jan. 4, 1944

2,338,388

UNITED STATES PATENT OFFICE 2,338,388

IRRADIATING TUBE

Stewart C. Whitman, deceased, late of New York, N. Y., by Helen Whitman, administratrix, New York, N. Y.

Original application April 4, 1941, Serial No. 386,936. Divided and this application October 29, 1941, Serial No. 417,039

2 Claims. (Cl. 250—48)

This application is a division of an application filed April 4, 1941, Serial No. 386,936, by the said Stewart C. Whitman, deceased.

This invention relates to an ultraviolet irradiating unit especially designed for the irradiation of beer, wine, milk, soft drinks, water and other liquids.

The main object of the invention is to provide a unit of this character which is simple of construction, reliable and efficient in action, adapted to be operated at either high or low voltage and at low cost, and whereby the liquid to be treated while in course of flow may be subjected in a most effective manner to the sterilizing action of ultraviolet rays.

A further object of the invention is to provide a novel construction of unit of this character which adapts the unit to be made so as to act upon the liquid while it is flowing in a manner best suited for a particular purpose.

The invention consists in a liquid sterilizing unit embodying certain novel features of construction, combination and arrangement of parts hereinafter fully described and claimed, and as shown in the accompanying drawing, in which:

Fig. 1 is a vertical longitudinal section through one form of sterilizer embodying the invention.

Fig. 2 is a similar view of another form of sterilizer embodying the invention.

Fig. 3 is a cross-section on the line 3—3 of Fig. 2.

In carrying the invention into practice, as shown in Fig. 1, the sterilizer comprises an ultraviolet tube I having enlarged terminal portions 2 and 3 and an elongated intermediate cylindrical body portion 4 formed of glass having high transmission of ultraviolet. Surrounding the cylindrical portion 4 is an outer cylinder 5 forming therewith an annular channel through which liquid may flow in contact with the portion 4 of the tube. An inlet connection 6 for coupling engagement with a supply conductor 7 is provoided at one end of the annular channel, and an outlet connection 8 for coupling connection with a discharge conductor 9 is provided at the opposite end of the channel. Crater electrodes 10 and 11 are respectively arranged in the enlarged terminal portions 2 and 3, and suitably supported by one of these electrodes is a mercury containing cup 12. Arranged at the opposite ends of the tube are screw bases or plugs 13 and 14 whereby the sterilizer may be mounted in position upon a suitable support and connected with a suitable source of electric energy. In the operation of this sterilizer liquid flowing from the conductor 7 through the inlet 6 into the upper end of the annular channel flows downwardly therein in the form of a comparatively thin annular stream in contact with the body 4 of the ultraviolet tube I whereby the liquid in its flow is effectively irradiated. The capacity or area of the channel may be such that a predetermined amount of liquid to be subjected to irradiation within a given time may be passed through the tube, so that either continuous irradiation at a given rate or intermittent irradiation of regulated amounts of the liquid may be effected. This form of device is especially adapted for the irradiating of beer, wines, soft drinks, water and other beverages, but is also applicable for a variety of other purposes. For irradiating beer, this form of tube, by the passage of the beer in a thin layer over the ultraviolet transmitting surface of the tube, irradiates the beer in a thorough manner, as tests show that beer is relatively opaque to ultraviolet radiation which penetrates only a short distance into such liquid. By governing the amount of liquid subjected to irradiation at a time and controlling the time period of irradiation, beer and other liquids may be thoroughly irradiated without imparting a musty taste or odor or other objectionable taste or odor or causing color changes of the liquids.

In the form of the invention shown in Figs. 2 and 3, a sterilizer Ia similar in many respects to that shown in Fig. 1 is disclosed. This sterilizer Ia comprises an ultraviolet tube having expanded terminal portions 2a and 3a and an elongated cylindrical intermediate or body portion 4a. Surrounding the body portion 4a is a liquid conductor 5a forming therewith a liquid flow channel. At the upper end of this flow channel is a liquid inlet connection 6a for coupling engagement with a supply conductor 7a and at the lower end of the channel is an outlet connection 8a for coupling engagement with a discharge conductor 9a. Arranged in the enlarged terminal portions 2a and 3a are crater electrodes 10a and 11a, suitably supported by the crater electrode 11a is a mercury containing cup 12a. The liquid conductor 5a in this form of the invention is of non-uniform diameter and comprises spaced bead-like or enlarged portions 15 arranged in alternation with and connected by straight cylindrical portions 16. The beaded portions are preferably formed as surfaces of revolution by revolving a circular arc about the axis of the ultraviolet tube, and the straight portions connect adjacent ends of these arcs. There is thereby formed between the body portion of the ultraviolet tube and the liquid conductor a liquid flow channel through which liquid, entering through the inlet 6a, flows through the channel toward the outlet 8a and discharges through the conductor 9a. This liquid on its passage is subjected to ultraviolet radiation from the tube whereby its sterilization is effected. Owing to the form of the tube in which portions of the liquid may collect in comparatively quiet pools in the beads or enlargements 15 flow of the liquid at a comparatively low velocity is provided for to increase its period of exposure to the ultraviolet radiation. This form of the device allows the flow of liquid to be retarded at intervals in the beaded portions, so that a longer period of exposure may be obtained than can be obtained with the type of tube shown in Fig. 1.

Both forms of sterilizers provide for the comparatively rapid irradiation of the liquid and the irradiation of the liquid in a most effective manner so that when discharged through the outlet 8 or 8a it will be sterile. Sterilizers of these forms may be individually used for sterilizing liquid or may be employed in any suitable number in a sterilizing apparatus or liquid sterilizing and bottle filling machine so that a desired number of sterilizers may be operated at the same time or connected with a common source of energy, allowing rapid sterilization of liquids for bottling purposes in an economical manner.

While the structures disclosed for purposes of exemplification are preferred, it will, of course, be understood that changes in the form, construction and arrangement of the parts, other than those disclosed, may be made without departing from the spirit or sacrificing any of the advantages of the invention.

What is claimed as new and patentable is:

1. An ultraviolet irradiating tube having the general form of a dumbbell and comprising an envelope consisting of a continuously straight body portion of an even diameter throughout its length and terminating in laterally expanded end portions forming electrode chambers of appreciably greater diameter than the body portion, a casing surrounding the body portion of the envelope, coaxially therewith, and extending between and being integrally connected with and supported by inner portions of the electrode chambers and of less diameter than the electrode chambers, the casing being spaced radially from said body portion to provide a flow channel therebetween about the body portion, connections at the ends of the casing for the supply of liquid to and discharge of said liquid from said channel, crater electrodes disposed in the electrode chambers concentrically thereto in longitudinal alignment with each other and in the line with the axis of the envelope and terminal plugs fixed to and passing through outer ends of the electrode chambers and coaxial with the latter and said envelope, said plugs forming reinforcements for the outer walls of the electrode chambers and being in electrical connection with and supporting said electrodes.

2. An ultraviolet irradiating tube having the general form of a dumbbell and comprising an envelope consisting of a continuously straight body portion terminating in laterally expanded end portions forming electrode chambers, a casing surrounding the body portion of the envelope, coaxially therewith, and extending between and being connected with and supported by the electrode chambers, said casing being spaced from the envelope to form therewith a liquid flow channel and being formed from end to end thereof with regularly spaced alternately arranged globular portions and straight cylindrical portions alternately widening and constricting said channel, connections at the ends of the casing for the supply of liquid to and discharge of the liquid from said channel, crater electrodes disposed in the electrode chambers in longitudinal alinement with each other and in the line of the axis of the envelope, and terminal plugs fixed to and reinforcing the outer walls of the electrode chambers and in electrical connection with and supporting the electrodes.

HELEN WHITMAN,
*Administratrix of the Estate of Stewart C. Whitman, Deceased.*